United States Patent
Ling

(10) Patent No.: US 7,825,644 B1
(45) Date of Patent: Nov. 2, 2010

(54) SYSTEM AND METHOD FOR PROVIDING A PULSATING CURRENT OUTPUT HAVING ULTRA FAST RISE AND FALL TIMES

(75) Inventor: Lawrence Hok-Sun Ling, Fanling (HK)

(73) Assignee: National Semiconductor Corporation, Santa Clara, CA (US)

( * ) Notice: Subject to any disclaimer, the term of this patent is extended or adjusted under 35 U.S.C. 154(b) by 680 days.

(21) Appl. No.: 11/731,961

(22) Filed: Apr. 2, 2007

(51) Int. Cl.
*G05F 1/59* (2006.01)

(52) U.S. Cl. .................. 323/282; 323/280; 323/312

(58) Field of Classification Search .............. 323/282, 323/286, 312, 283–285, 280
See application file for complete search history.

(56) References Cited

U.S. PATENT DOCUMENTS

| | | | | |
|---|---|---|---|---|
| 5,396,188 | A * | 3/1995 | Aoki .................. | 327/552 |
| 5,420,499 | A * | 5/1995 | DeShazo ............. | 323/315 |
| 6,084,465 | A * | 7/2000 | Dasgupta ............ | 327/554 |
| 6,239,654 | B1 * | 5/2001 | Yamamoto .......... | 330/9 |
| 6,583,609 | B1 * | 6/2003 | Pardoen .............. | 323/283 |
| 6,606,257 | B2 | 8/2003 | Bourdillon | |
| 6,683,419 | B2 | 1/2004 | Kriparos | |
| 6,784,728 | B2 * | 8/2004 | Fischer ............... | 327/554 |
| 6,844,760 | B2 | 1/2005 | Koharagi et al. | |
| 6,871,289 | B2 | 3/2005 | Pullen et al. | |
| 7,058,373 | B2 | 6/2006 | Grigore | |
| 7,115,888 | B2 | 10/2006 | Hachiya et al. | |
| 7,132,820 | B2 | 11/2006 | Walters et al. | |
| 7,388,359 | B1 | 6/2008 | Ling | |
| 7,425,819 | B2 | 9/2008 | Isobe | |
| 7,443,209 | B2 | 10/2008 | Chang | |
| 2007/0132439 | A1 * | 6/2007 | Tsuzaki .............. | 323/284 |

OTHER PUBLICATIONS

Tawen Mei, et al., "Circuit and Method for Average-Current Regulation of Light Emitting Diodes", U.S. Appl. No. 11/703,981, filed Feb. 8, 2007.

Kenji Tomiyoshi, et al., "System and Method for Providing a Sample and Hold Circuit for Maintaining an Output Voltage of a Constant Current Source Circuit When a Feedback Loop Is Disconnected", U.S. Appl. No. 11/784,184, filed Apr. 5, 2007.

"PWM LED Driver and Boost, Flyback and SEPIC Controller", Linear Technology Corporation 2005, 24 pages.

"Constant Current LED Driver with Digital and PWM Brightness Control", Texas Instruments, Nov. 2004, 25 pages.

Prathyusha Narra, et al., "An Effective LED Dimming Approach", 2004 IEEE, p. 1671-1676.

T. Suntio et al., "Dynamic Effects of Inductor Current Ripple in Average Current Mode Control", 2001 IEEE, pp. 1259-1264.

Zaohong Yang et al., "DC-To-DC Buck Converters with Novel Current Mode Control", 1999 IEEE, pp. 1158-1164.

* cited by examiner

*Primary Examiner*—Harry Behm

(57) ABSTRACT

A system and method are disclosed for providing a pulsating current output having ultra fast rise and fall times. A linear constant current controller is provided that comprises an operational amplifier. A compensation capacitor is connected to an output of the operational amplifier through a switch circuit. The switch circuit closes to initially charge up the compensation capacitor. The switch circuit then opens to isolate the compensation capacitor when the output of the operational amplifier is connected to ground. A value of voltage is maintained on the compensation capacitor so that the compensation capacitor does not need to be recharged for each subsequent cycle of the pulsating current output. The linear constant current controller is capable of generating a pulsating output current that has rise and fall times in the tens of nanoseconds.

20 Claims, 10 Drawing Sheets

ULTRA FAST SLEW RATE
LINEAR CONSTANT CURRENT CONTROLLER

SYSTEM AND METHOD FOR PROVIDING A PULSATING CURRENT OUTPUT HAVING ULTRA FAST RISE AND FALL TIMES

TECHNICAL FIELD OF THE INVENTION

The present invention is generally directed to electronic circuitry and, in particular, to a system and method for providing a pulsating current output having ultra fast rise and fall times.

BACKGROUND OF THE INVENTION

The efficient operation of light emitting diode (LED) circuits in LED dimming applications requires a precise pulsating current. LED dimming systems that have a high dimming ratio require a precise pulsating current signal that has a very fast rise time and a very fast fall time. The rate of the rise of the current signal (and the rate of the fall of the current signal) is sometimes referred to as a slew rate. It is desirable to have a slew rate that is as large as possible (i.e., to have rise times and fall times that are as short as possible).

FIG. 1 illustrates a schematic diagram 100 of a prior art circuit for generating a precise pulsating current output for a plurality of light emitting diodes. A direct current (DC) to direct current (DC) power converter circuit 110 is employed to provide a pulsating current output to the light emitting diodes 120. As shown in FIG. 1, the light emitting diodes 120 are connected in series. The first LED is designated with reference numeral 120a, the second LED is designated with reference numeral 120b, and so on. The output current IOUT passes to ground through a sense resistor (designated RISNS).

The DC-DC power converter circuit 110 comprises a power stage unit 130, an error amplifier 140, and a voltage reference source 150 connected together as shown in FIG. 1. The power stage unit 130 provides supply rail and regulation with respect to the output current IOUT. A feedback signal from feedback node VFB is provided to the error amplifier 140 to enable the power stage unit 130 to regulate the value of the output current IOUT.

A pulse width modulated (PWM) input signal is provided to the power stage unit 130 through an enable (EN) port. The duty cycle of the pulsating output current IOUT is controlled by turning the power stage unit 130 on and off.

The DC-DC power converter circuit 110 shown in FIG. 1 provides a high power efficiency. However, the output current rise times (and fall times) are limited by the operation of an inductor and output capacitor (not shown in FIG. 1). The output current rise time (and output current fall time) that is achievable by the DC-DC power converter circuit 110 ranges from tens of microseconds to hundreds of microseconds.

FIG. 2 illustrates a schematic diagram 200 of another prior art circuit for generating a precise pulsating current output for a plurality of light emitting diodes. A direct current (DC) to direct current (DC) power converter circuit 210 is employed to provide a supply rail to a linear constant current controller 230. As shown in FIG. 2, the output of the DC-DC power converter 210 is connected to a plurality of light emitting diodes 220.

The light emitting diodes 220 are connected in series. The first LED is designated with reference numeral 220a, the second LED is designated with reference numeral 220b, and so on. The output current IOUT through the light emitting diodes 220 is connected to the linear constant current controller 230 through an input port that is designated with the letters OUT.

A reference current source 240 is connected to the linear constant current controller 230. The reference current source 240 provides a reference current (designated IREF) to the linear constant current controller 230 through an input port that is designated with the letters IREFIN. A typical value of the reference current IREF is forty-four microamperes (44 $\mu$A). The linear constant current controller 230 receives the reference current IREF as input and then outputs the output current IOUT. The output current IOUT is equal to an integer value (designated by the letter M) times the input current IREF. That is, IOUT equals M times IREF.

A pulse width modulated (PWM) input signal is provided to the linear constant current controller 230 through an input port that is designated with the letters PWMIN. The duty cycle of the pulsating output current IOUT is controlled by turning the linear constant current controller 230 on and off.

FIG. 3 illustrates a more detailed schematic diagram 300 of the prior art linear constant current controller 230 that is shown in FIG. 2. The input node IREFIN that receives the input reference current IREF from the input reference source 240 is connected to a first end of a sense resistor 310 (designated "RISNS*M" where M is the previously mentioned integer value). A typical value of the sense resistor 310 is four thousand five hundred ohms (4500$\Omega$). A second end of the sense resistor 310 is connected to ground. The input node IREFIN is also connected to a non-inverting input (designated +) of an operational transconductance amplifier (OTA) 320. A feedback signal line 330 is connected to the inverting input (designated −) of the OTA 320. The OTA 320 has a high input impedance and a high output impedance.

When the reference current IREF (that defines the value of the output current IOUT) is provided to the IREFIN node, a reference voltage (designated VREF) is developed as a reference voltage for the OTA 320. The reference voltage VREF is equal to the product of the reference current IREF and the resistance (RISNS*M) of sense resistor 310.

The output of the OTA 320 is connected to an input of a unity gain voltage buffer 340. The unity gain voltage buffer 340 has a high input impedance and a low output impedance. The output of the unity gain voltage buffer 340 is connected to the gate of an n-channel field effect transistor (NFET) 350. As shown in FIG. 3, the drain of NFET 350 is connected to the output node OUT and the source of the NFET 350 is connected to ground through a sense resistor 360 (designated RISNS). A typical value of the sense resistor 360 is five ohms (5$\Omega$). The resistance value of the sense resistor 310 is M times the resistance value of the sense resistor 360. The source of NFET 350 is also connected to the inverting input of the OTA 320 through feedback signal line 330.

The pulse width modulated (PWM) input signal that is provided to the linear constant current controller 230 through the PWMIN input port is connected to an inverter circuit 370. The output of the inverter circuit 370 controls a switch 380. A first end of the switch 380 is connected between the output of the OTA 320 and the input of the unity gain buffer 340. A second end of the switch 380 is connected to ground.

When the pulse width modulated (PWM) input signal at the PWMIN node goes high, the inverter 370 outputs a low signal that opens the switch 380. When the switch 380 is opened, the output of the OTA 320 is provided to the unity gain buffer 340. When the pulse width modulated (PWM) input signal at the PWMIN node goes low, the inverter 370 outputs a high signal that closes the switch 380. When the switch 380 is closed, the output of the OTA 320 is connected to ground.

As also shown in FIG. 3, the output of the OTA 320 is connected to a first end of a compensation resistor 390 (designated with the letters $R_C$). A typical value of the compensation resistor 390 is ten thousand ohms (10 kΩ). The second end of the compensation resistor 390 is connected to a first end of a compensation capacitor 395 (designated with the letters $C_C$). A typical value of the compensation capacitor 395 is four picofarads (4 pF). The second end of the compensation capacitor 395 is connected to ground.

The switch 380 operates in response to the pulse width modulated (PWM) input signal that is provided to the linear constant current controller 230 through the PWMIN input port. The pulse width modulated (PWM) input signal is passed through the inverter circuit 370.

The reference current IREF from the reference current source 240 is provided to the linear constant current controller 230 at the IREFIN node. The reference current IREF through sense transistor 310 creates a reference voltage VREF at the non-inverting input of the operational transconductance amplifier (OTA) 320. The pulse width modulation logic signal (PWM) is provided to the linear constant current controller 230 at the PWMIN node.

When the logic signal PWM is high, then the switch 380 opens. This provides the output of the OTA 320 to the unity gain buffer 340. When the logic signal PWM is low, then the switch 380 closes. This connects the output of the OTA 320 to ground.

After the compensation capacitor 395 has been charged up during the first PWM pulse the VC voltage decreases during the next cycle. Therefore, the compensation capacitor 395 needs to be recharged during the subsequent PWM pulses.

As previously mentioned, the output current IOUT is equal to M times the input reference current IREF. The output current IOUT is regulated when the logic signal PWM is high. The sense voltage (designated VSNS) across the sense resistor 360 is equal to the reference voltage VREF when the output current IOUT is regulated.

The linear constant current controller 230 shown in FIG. 2 and in FIG. 3 provides an output current rise time (and an output current fall time) that ranges from hundreds of nanoseconds to thousands of nanoseconds. However, the output current rise time is limited by the time that is required to charge up the compensation capacitor 395 for regulation. This means that prior art linear constant current controller 230 is not capable of achieving an output current rise time that is in the tens of nanoseconds.

Therefore, there is a need in the art for a system and method that is capable of providing a pulsating current output having ultra fast rise and fall times. In particular, there is a need in the art for a system and method that is capable of providing output current rise and fall times that are in the tens of nanoseconds.

An advantageous embodiment of the system and method of the present invention provides a pulsating current output that has ultra fast rise and fall times. A linear constant current controller is provided that comprises an operational amplifier. A compensation capacitor is connected to an output of the operational amplifier through a VC switch circuit. The VC switch circuit closes to initially charge up the compensation capacitor. The VC switch circuit then opens to isolate the compensation capacitor when the output of the operational amplifier is connected to ground. A value of voltage is maintained on the compensation capacitor so that the compensation capacitor does not need to be recharged for each subsequent cycle of the pulsating current output. The linear constant current controller of the present invention is capable of generating a pulsating output current that has rise and fall times in the tens of nanoseconds.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 4 through 12, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged electronic device.

Figure 4:
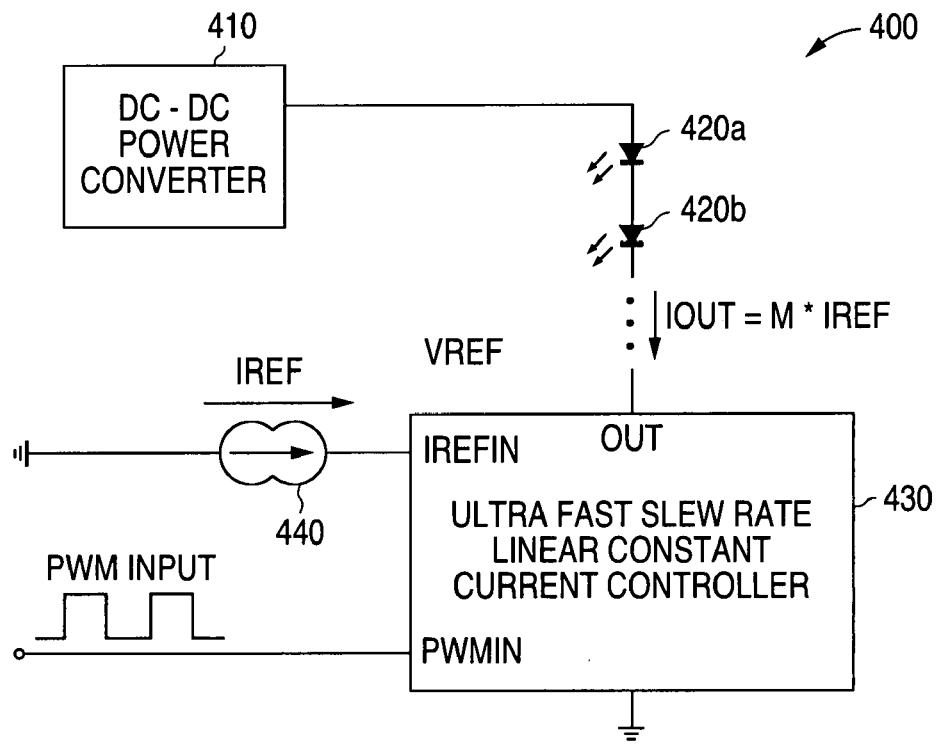
FIG. 4 illustrates a schematic diagram of a circuit that uses an ultra fast slew rate linear constant current controller to provide a pulsating current output for a plurality of light emitting diodes in accordance with the principles of the present invention.

FIG. 4 illustrates a schematic diagram 400 of a circuit for generating a precise pulsating current output for a plurality of light emitting diodes in accordance with the principles of the present invention. A direct current (DC) to direct current (DC) power converter circuit 410 is employed to provide a supply rail to an ultra fast slew rate linear constant current controller 430. For convenience, the ultra fast slew rate linear constant current controller 430 of the present invention will be referred to as the linear constant current controller 430. As shown in FIG. 4, the output of the DC-DC power converter 410 is connected to a plurality of light emitting diodes 420.

The light emitting diodes 420 are connected in series. The first LED is designated with reference numeral 420a, the second LED is designated with reference numeral 420b, and so on. The output current IOUT through the light emitting diodes 420 is connected to the linear constant current controller 430 through an output port that is designated with the letters OUT.

A reference current source 440 is connected to the linear constant current controller 430. The reference current source 440 provides a reference current (designated IREF) to the linear constant current controller 430 through an input port that is designated with the letters IREFIN. A typical value of the reference current IREF is forty-four microamperes (44 µA). The linear constant current controller 430 receives the reference current IREF as input and then outputs the output current IOUT. The output current IOUT is equal to an integer value (designated by the letter M) times the input current IREF. That is, IOUT equals M times IREF.

A pulse width modulated (PWM) input signal is provided to the linear constant current controller 430 through an input port that is designated with the letters PWMIN. The duty cycle of the pulsating output current IOUT is controlled by turning the linear constant current controller 430 on and off.

Figure 5:
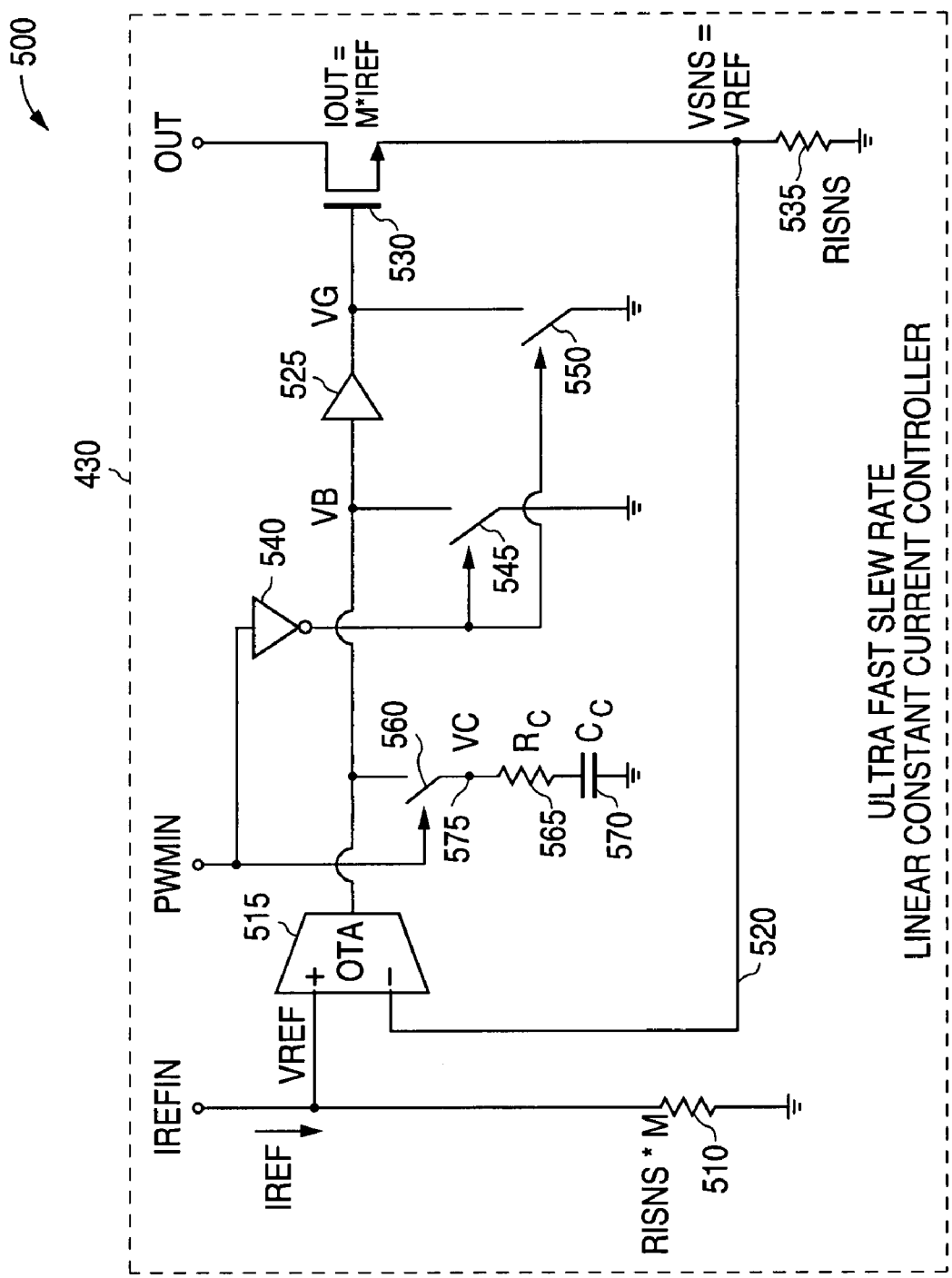
FIG. 5 illustrates a more detailed schematic diagram of the ultra fast slew rate linear constant current controller of the present invention shown in FIG. 4.

FIG. 5 illustrates a more detailed schematic diagram 500 of the prior art linear constant current controller 430 that is shown in FIG. 4. The input node IREFIN that receives the input reference current IREF from the input reference source 440 is connected to a first end of a sense resistor 510 (designated "RISNS*M" where M is the previously mentioned integer value). A typical value of the sense resistor 510 is four thousand five hundred ohms (4500Ω). A second end of the sense resistor 510 is connected to ground. The input node IREFIN is also connected to a non-inverting input (designated +) of an operational transconductance amplifier (OTA) 515. A feedback signal line 520 is connected to the inverting input (designated −) of the OTA 515. The OTA 515 has a high input impedance and a high output impedance.

An advantageous embodiment of the present invention comprises an operational transconductance amplifier (OTA) 515. It is understood that the invention is not limited to the use of an operational transconductance amplifier and that other types of operational amplifiers and other types of similar circuits may also be used to practice the invention.

It is also understood that the invention is not limited to providing pulsating current output to light emitting diode (LED) applications. It is understood that the invention may also be used to provide pulsating current output to other types of circuit applications.

When the reference current IREF (that defines the value of the output current IOUT) is provided to the IREFIN node, a reference voltage (designated VREF) is developed as a reference voltage for the OTA 515. The reference voltage VREF is equal to the product of the reference current IREF and the resistance (RISNS*M) of sense resistor 510.

The output of the OTA 515 is connected to an input of a unity gain voltage buffer 525. The unity gain voltage buffer 525 has a high input impedance and a low output impedance. The output of the unity gain voltage buffer 525 is connected to the gate of an n-channel field effect transistor (NFET) 530. As shown in FIG. 5, the drain of NFET 530 is connected to the output node OUT and the source of the NFET 530 is connected to ground through a sense resistor 535 (designated RISNS). A typical value of the sense resistor 535 is five ohms (5Ω). The resistance value of the sense resistor 510 is M times the resistance value of the sense resistor 535. The source of NFET 530 is also connected to the negative input of the OTA 515 through feedback signal line 520.

The pulse width modulated (PWM) input signal that is provided to the linear constant current controller 430 through the PWMIN input port is connected to an inverter circuit 540. The output of the inverter circuit 540 controls a VB switch 545 and a VG switch 550. A first end of the VB switch 545 is connected between the output of the OTA 515 and the input of the unity gain buffer 525. A second end of the VB switch 545 is connected to ground. A first end of the VG switch 550 is connected between the output of the unity gain buffer 525 and the gate of the NFET 530. A second end of the VB switch 550 is connected to ground.

When the pulse width modulated (PWM) input signal at the PWMIN node goes high, the inverter 540 outputs a low signal that opens the VB switch 545 and opens the VG switch 550. When the VB switch 545 is opened, the output of the OTA 515 is provided to the unity gain buffer 525. When the VG switch 550 is opened, the output of the unity gain buffer 525 is provided to the gate of the NFET 530.

When the pulse width modulated (PWM) input signal at the PWMIN node goes low, the inverter 540 outputs a high signal that closes the VB switch 545 and closes the VG switch 550. When the VB switch 545 is closed, the output of the OTA 515 is connected to ground. When the VG switch 550 is closed, the output of the unity gain buffer 525 is connected to ground.

As also shown in FIG. 5, the output of the OTA 515 is connected to a first end of a VC switch 560. The second end of the VC switch 560 is connected to a first end of a compensation resistor 565 (designated with the letters $R_C$). A typical value of the compensation resistor 565 is ten thousand ohms (10 kΩ). The second end of the compensation resistor 565 is connected to a first end of a compensation capacitor 570 (designated with the letters $C_C$). A typical value of the compensation capacitor 570 is five picofarads (5 pF). The second end of the compensation capacitor 570 is connected to ground.

The VC switch 560 operates in response to the pulse width modulated (PWM) input signal that is provided to the linear constant current controller 430 through the PWMIN input port. Unlike the case for the VB switch 545 and the VG switch 550, the pulse width modulated (PWM) input signal is not passed through an inverter circuit.

Therefore, when the pulse width modulated (PWM) input signal at the PWMIN node goes high, the high signal closes the VC switch 560. When the VC switch 560 is closed, the output of the OTA 515 is provided to the VC node 575 and to the compensation resistor 565 $R_C$ and to the compensation capacitor 570 $C_C$. When the pulse width modulated (PWM) input signal at the PWMIN node goes low, the low signal opens the VC switch 560. When the VC switch 560 is opened, the output of the OTA 515 is removed from the VC node 575 and from the compensation resistor 565 $R_C$ and from the compensation capacitor 570 $C_C$.

The reference current IREF from the reference current source 440 is provided to the linear constant current controller 430 at the IREFIN node. The reference current IREF through sense transistor 510 creates a reference voltage VREF at the non-inverting input of the operational transconductance amplifier (OTA) 515. The pulse width modulation logic signal (PWM) is provided to the linear constant current controller 430 at the PWMIN node.

When the logic signal PWM is high, then the VC switch 560 closes and connects the output of the OTA 515 to the VC node 575. This charges the compensation capacitor 570. When the logic signal PWM is high, then the VB switch 545 opens. This provides the output of the OTA 515 to the unity gain buffer 525. When the logic signal PWM is high, then the VG switch 550 also opens and provides the output of the unity gain buffer 525 to the gate of the NFET 530.

When the logic signal PWM is low, then the VC switch 560 opens. This isolates the VC node 575 from the OTA 515. Opening the VC switch 560 isolates the charge that has accumulated on the compensation capacitor 570. When the logic signal PWM is low, then the VB switch closes. This connects the output of the OTA 515 to ground. When the logic signal PWM is low, then the VG switch also closes. This connects the output of the unity gain buffer 525 to ground.

After the compensation capacitor 570 has been charged up during the first PWM pulse the required VC voltage is maintained on the compensation capacitor 570. Therefore, the compensation capacitor 570 does not need to be recharged during the subsequent PWM pulses. The VC voltage that is maintained on the compensation capacitor 570 significantly reduces the rise time of the output current signal (IOUT). When the logic signal PWM is low, closing the VB switch 545 and closing the VG switch 550 significantly reduces the fall time of the output current signal (IOUT).

As previously mentioned, the output current IOUT is equal to M times the input reference current IREF. The output current IOUT is regulated when the logic signal PWM is high. The sense voltage (designated VSNS) across the sense resistor 535 is equal to the reference voltage VREF when the output current IOUT is regulated.

Figure 1:
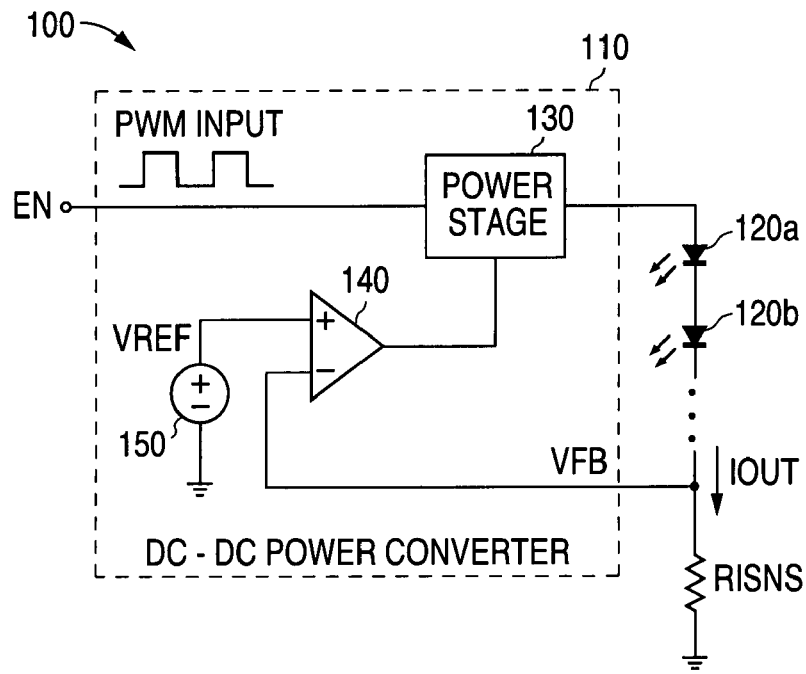
FIG. 1 illustrates a schematic diagram of a prior art circuit that uses a DC-DC power converter to provide a pulsating current output for a plurality of light emitting diodes.
Figure 2:
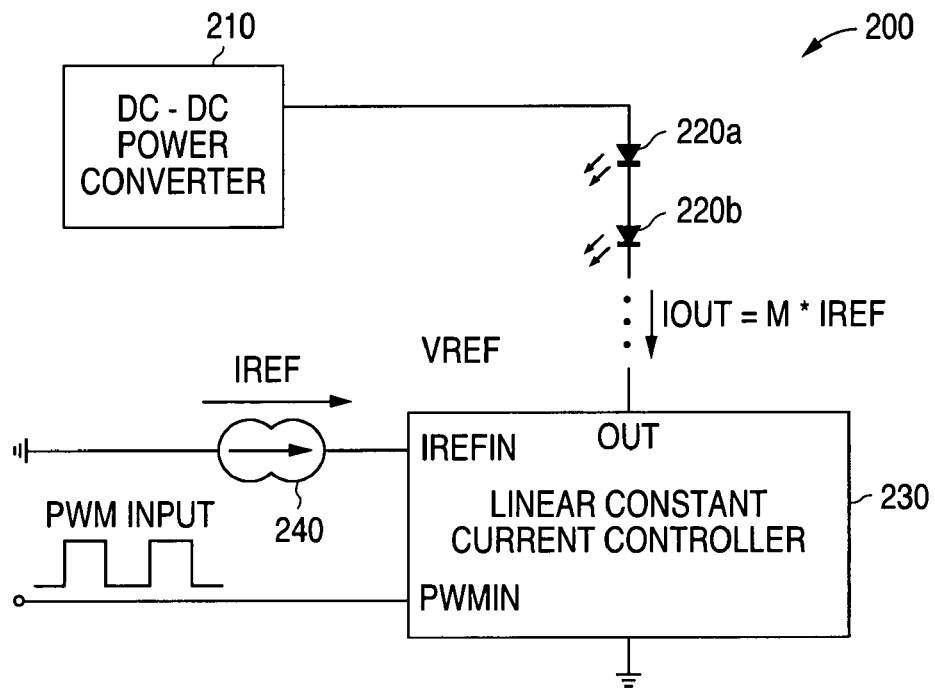
FIG. 2 illustrates a schematic diagram of a prior art circuit that uses a linear constant current controller to provide a pulsating current output for a plurality of light emitting diodes.
Figure 3:
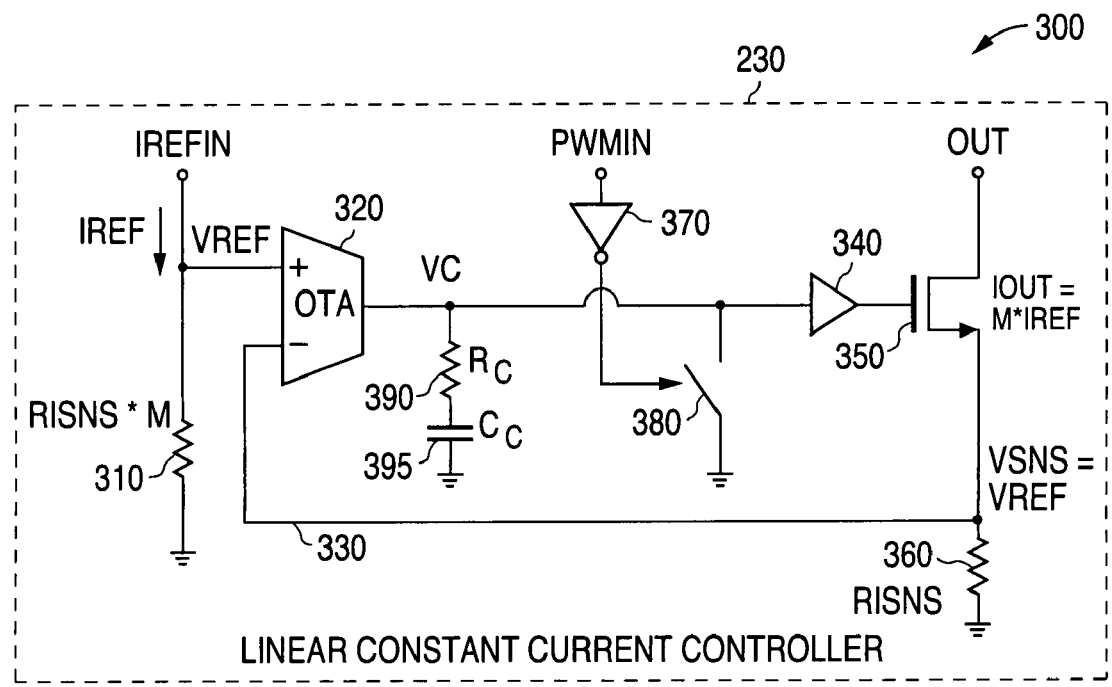
FIG. 3 illustrates a more detailed schematic diagram of the prior art linear constant current controller shown in FIG. 2.

The linear constant current controller 430 of the present invention that is shown in FIG. 4 and in FIG. 5 provides an much faster rise and fall times for the output current than does the prior art device shown in FIG. 2 and in FIG. 3. Specifically, the linear constant current controller 430 of the present invention provides output current rise and fall times that have a range of values in the tens of nanoseconds. The prior art linear constant current controller 230 provides output current rise and fall times that have a range of values in the hundreds of nanoseconds to thousands of nanoseconds. Therefore the linear constant current controller 430 of the present invention provides output current rise and fall times that are at least ten times faster than those that are provided by the prior art.

Figure 6A:
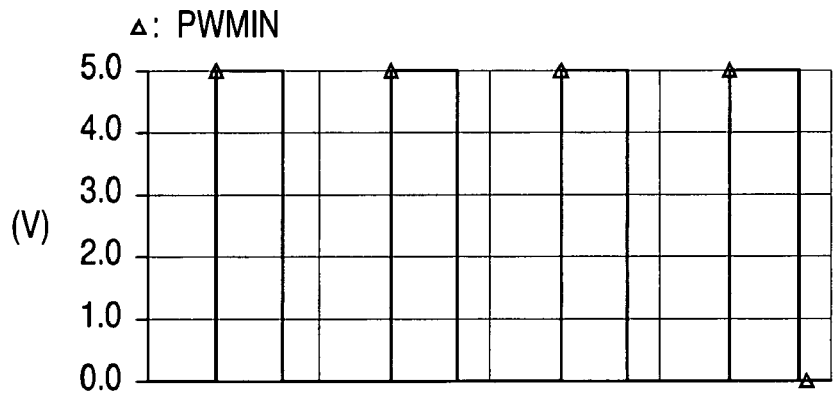
FIGS. 6A to 6C illustrate graphs showing the transient response of a prior art linear constant current controller.
Figure 6B:
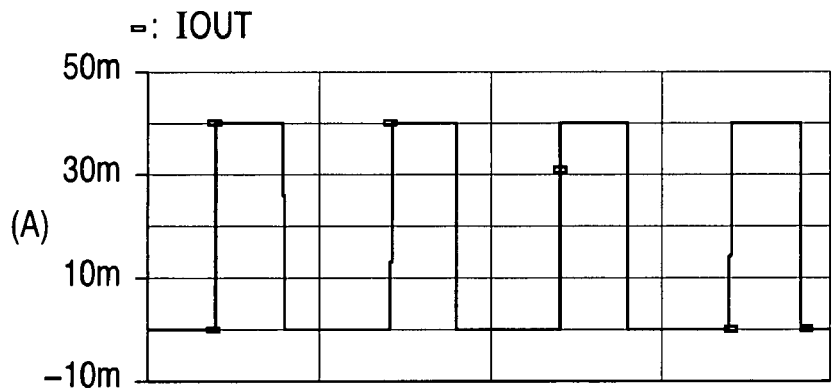
Figure 6C:
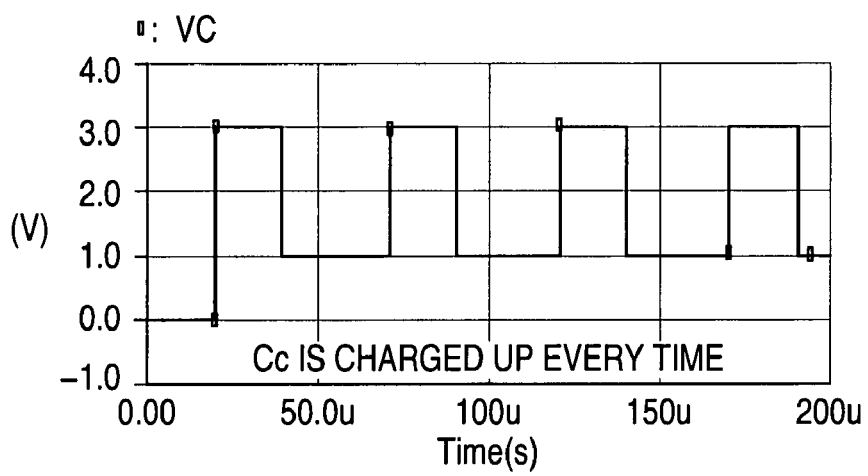

FIGS. 6A to 6C illustrate graphs showing the transient response of the prior art linear constant current controller 230. FIG. 6A shows the variation of the voltage of the logic signal PWM (designated PWMIN) over time. The low voltage is zero volts (0 V) and the high voltage is five volts (5 V).

FIG. 6B shows the corresponding variation of the output current IOUT. The low current is zero milliamperes (0 mA) and the high current is about forty milliamperes (40 mA).

FIG. 6C illustrates the variation of the VC voltage. The initial value is zero volts. During the first PWMIN high pulse, the high value of voltage reaches about three and two tenths volts (3.2 V). During subsequent PWMIN high pulses, the voltage reaches the high value of about 3.2 volts. But during the PWMIN low pulses, the voltage value drops to about one and two tenths volts (1.2 V). This is because the compensation capacitor 395 is partially discharged each cycle and therefore must be recharged for each cycle.

Figure 7A:
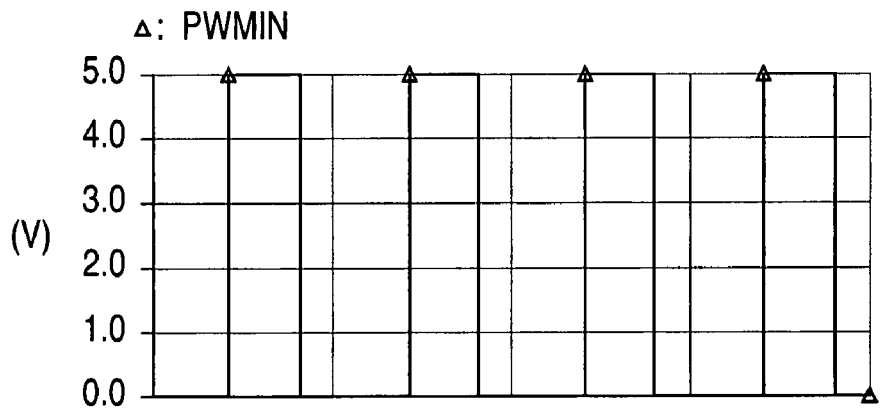
FIGS. 7A to 7C illustrate graphs showing the transient response of an ultra fast slew rate linear constant current controller of the present invention.
Figure 7B:
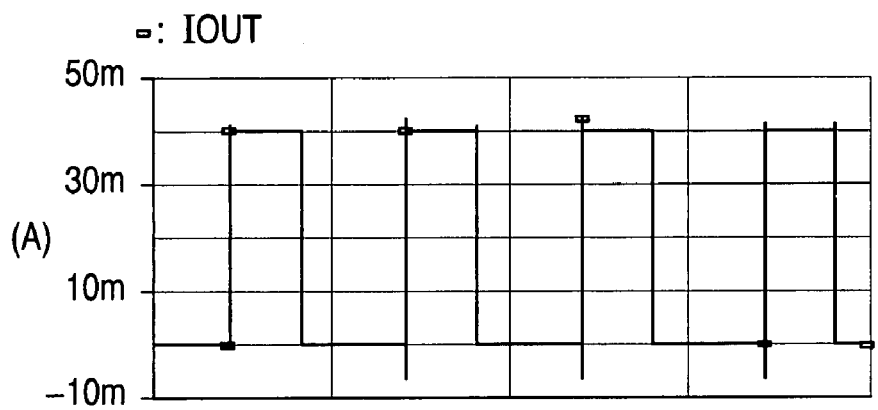
Figure 7C:
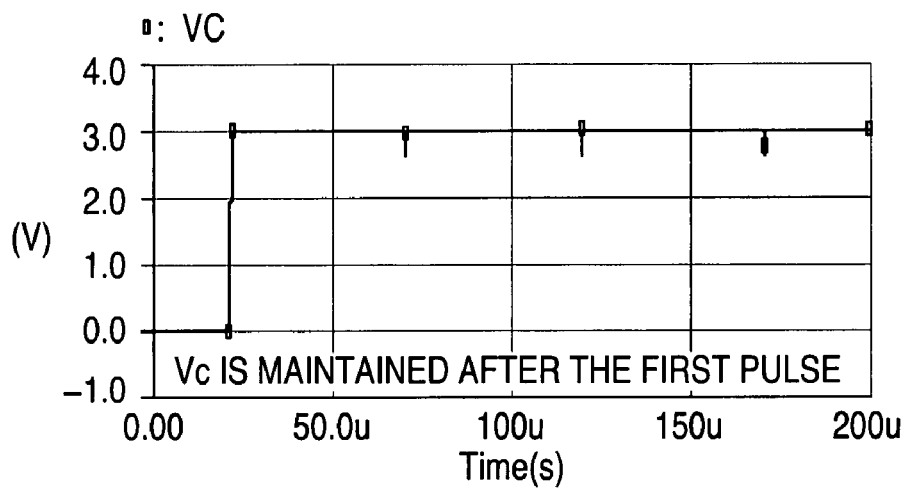

FIGS. 7A to 7C illustrate graphs showing the transient response of the linear constant current controller 430 of the present invention. FIG. 7A shows the variation of the voltage of the logic signal PWM (designated PWMIN) over time. The low voltage is zero volts (0 V) and the high voltage is five volts (5 V). This is substantially the same as the prior art response shown in FIG. 6A.

FIG. 7B shows the corresponding variation of the output current IOUT. The low current is zero milliamperes (0 mA) and the high current is about forty milliamperes (40 mA). This is substantially the same as the prior art response shown in FIG. 6B.

FIG. 7C illustrates the variation of the VC voltage. The initial value is zero volts. During the first PWMIN high pulse, the high value of voltage reaches about three and two tenths volts (3.2 V). During subsequent PWMIN pulses (both high and low), the VC voltage value remains at the high value of about 3.2 volts. Unlike the prior art response shown in FIG. 6C, the VC voltage value in FIG. 7C does not drop during the PWMIN low pulses. This is because the compensation capacitor 570 is isolated during the PWMIN low pulses and the VC voltage value is maintained. The compensation capacitor 570 does not need to be charged up for each cycle.

Figure 8A:
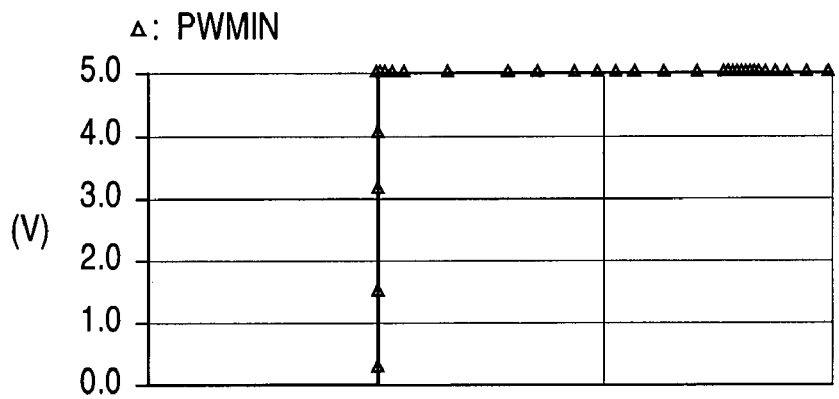
FIGS. 8A to 8C illustrate graphs showing the rise time of a prior art linear constant current controller.
Figure 8B:
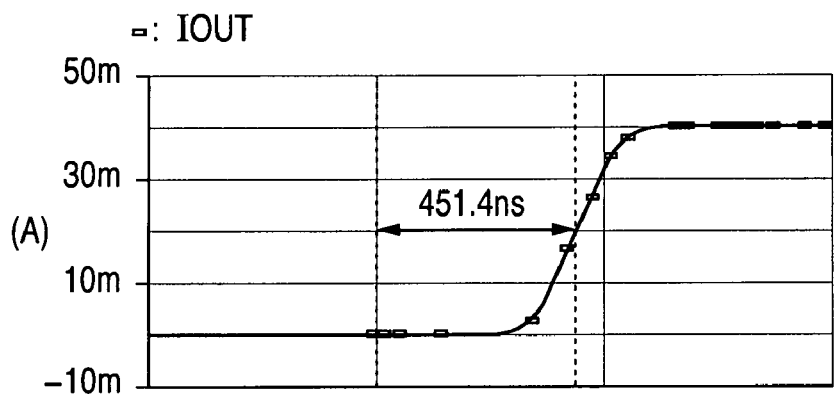
Figure 8C:
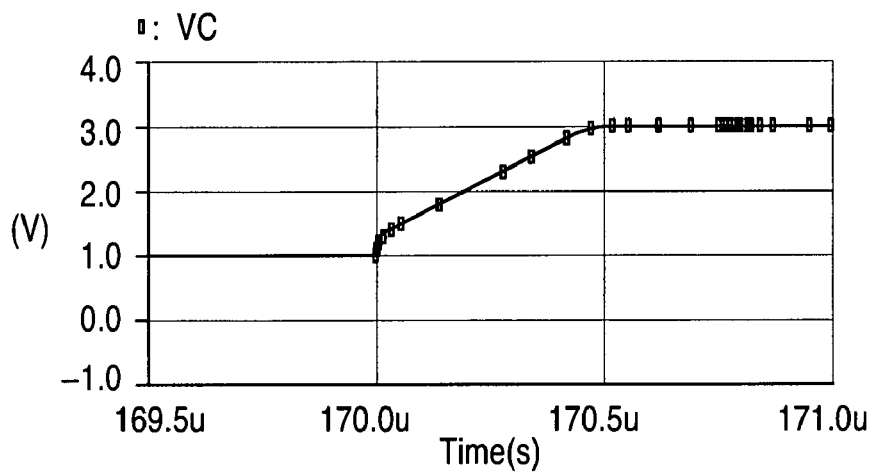

FIGS. 8A to 8C illustrate graphs showing the rise time of the prior art linear constant current controller 230. FIG. 8A shows the variation of the voltage of the logic signal PWM (designated PWMIN) over time. The low voltage is zero volts (0 V) and the high voltage is five volts (5 V). The transition from zero volts to five volts occurs at the time designated one hundred seventy microseconds (170.0 µs).

FIG. 8B shows the corresponding variation of the output current IOUT. The low current is zero milliamperes (0 mA) and the high current is about forty milliamperes (40 mA). FIG. 8B shows that the rise time of the IOUT signal is four hundred fifty one and four tenths nanoseconds (451.4 ns).

FIG. 8C shows the corresponding variation of the VC voltage. The initial value is about one and two tenths volts (1.2 V). The value of the VC voltage increases to about three and two tenths volts (3.2 V) in about one half of a microsecond (0.5 µs) or, equivalently, about five hundred nanoseconds (500 ns).

Figure 9A:
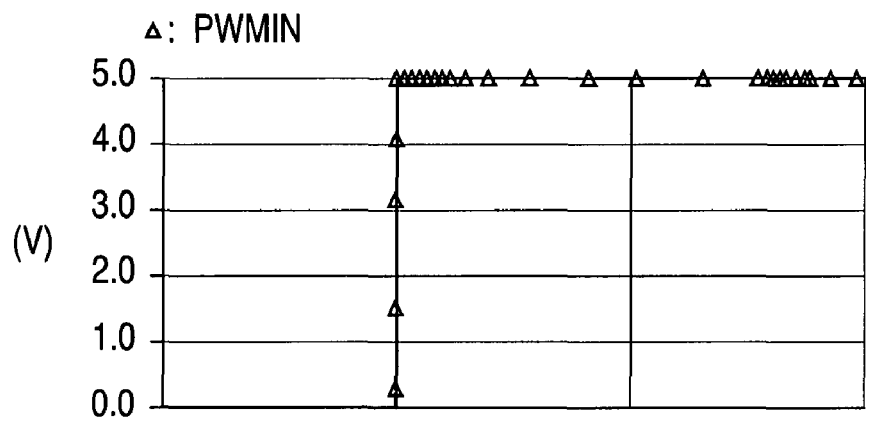
FIGS. 9A to 9C illustrate graphs showing the rise time of an ultra fast slew rate linear constant current controller of the present invention.
Figure 9B:
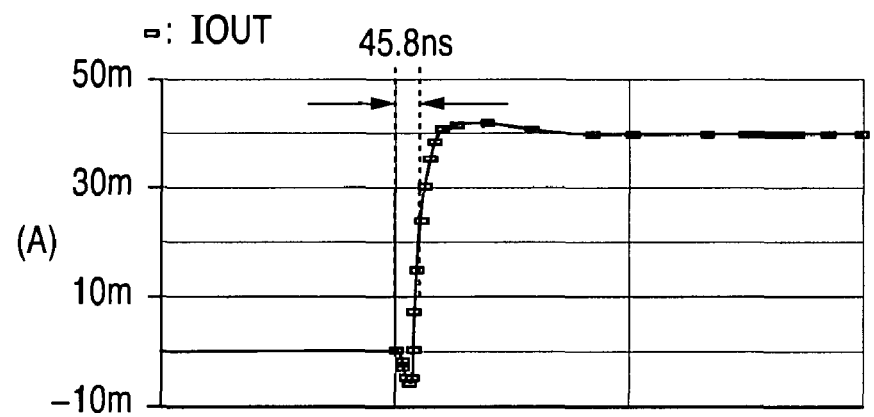
Figure 9C:
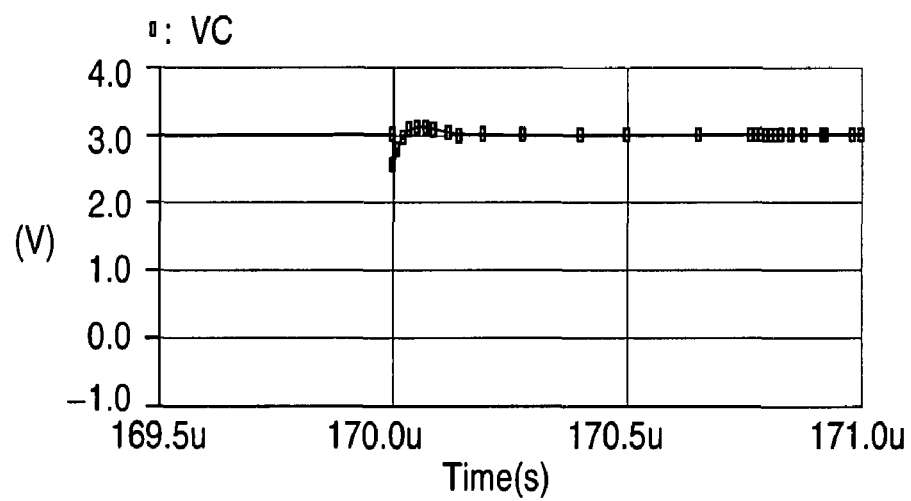

FIGS. 9A to 9C illustrate graphs showing the rise time of the linear constant current controller 430 of the present invention. FIG. 9A shows the variation of the voltage of the logic signal PWM (designated PWMIN) over time. The low voltage is zero volts (0 V) and the high voltage is five volts (5 V). The transition from zero volts to five volts occurs at the time designated one hundred seventy microseconds (170.0 µs). This is substantially the same as the prior art response shown in FIG. 8A.

FIG. 9B shows the corresponding variation of the output current IOUT. The low current is zero milliamperes (0 mA) and the high current is about forty milliamperes (40 mA). FIG. 9B shows that the rise time of the IOUT signal is forty five and eight tenths nanoseconds (45.8 ns). This represents a rise time that is about ten times faster than the rise time for the prior art device.

FIG. 9C shows the corresponding variation of the VC voltage. The initial value is about three and two tenths volts (3.2 V). The value of the VC voltage fluctuates slightly around this value but quickly returns to the 3.2 volt value.

Figure 10A:
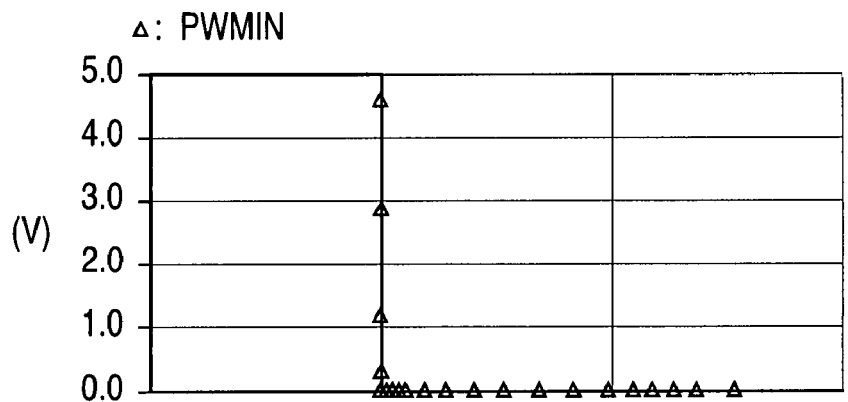
FIGS. 10A to 10C illustrate graphs showing the fall time of a prior art linear constant current controller.
Figure 10B:
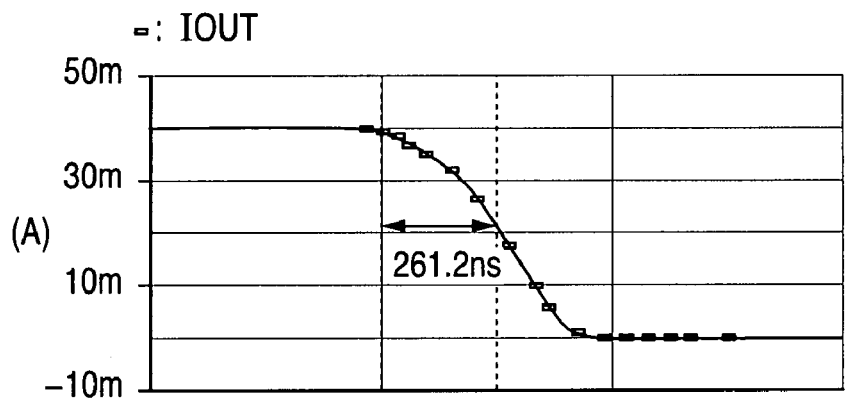
Figure 10C:
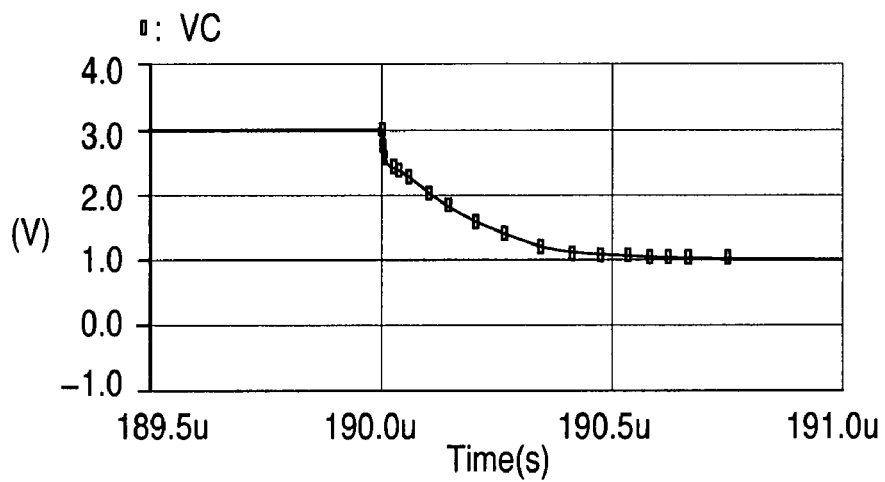

FIGS. 10A to 10C illustrate graphs showing the fall time of the prior art linear constant current controller 230. FIG. 10A shows the variation of the voltage of the logic signal PWM (designated PWMIN) over time. The high voltage is five volts (5 V) and the low voltage is zero volts (0 V). The transition from five volts to zero volts occurs at the time designated one hundred ninety microseconds (190.0 μs).

FIG. 10B shows the corresponding variation of the output current IOUT. The high current is about forty milliamperes (40 mA) and the low current is about zero milliamperes (0 mA). FIG. 10B shows that the fall time of the IOUT signal is two hundred sixty one and two tenths nanoseconds (261.2 ns).

FIG. 10C shows the corresponding variation of the VC voltage. The initial value is about three volts (3.0 V). The value of the VC voltage decreases to about one and two tenths volts (1.2 V) in about one half of a microsecond (0.5 μs) or, equivalently, about five hundred nanoseconds (500 ns).

Figure 11A:
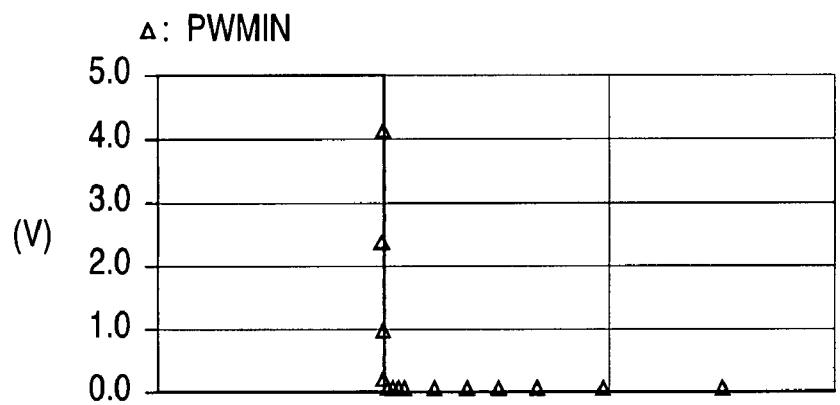
FIGS. 11A to 11C illustrate graphs showing the fall time of an ultra fast slew rate linear constant current controller of the present invention.
Figure 11B:
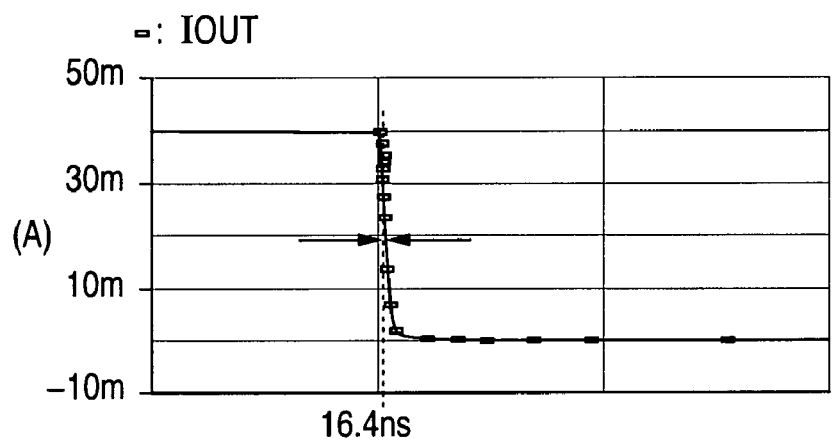
Figure 11C:
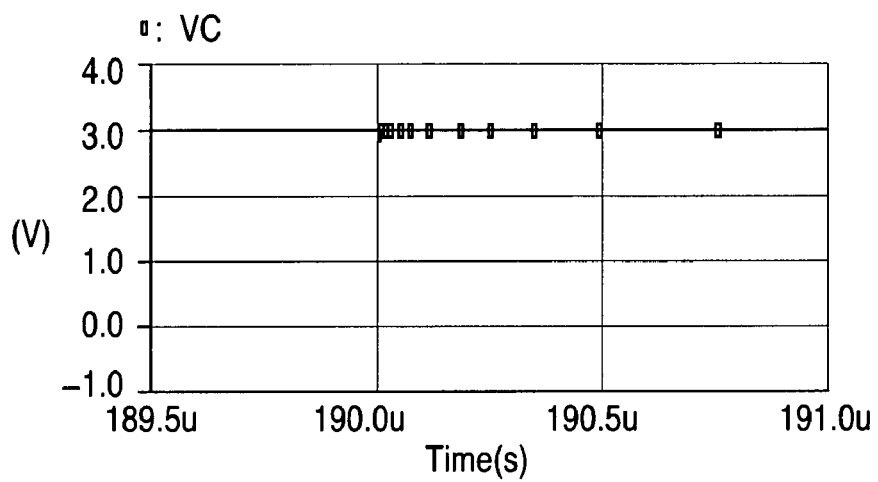

FIGS. 11A to 11C illustrate graphs showing the rise time of the linear constant current controller 430 of the present invention. FIG. 11A shows the variation of the voltage of the logic signal PWM (designated PWMIN) over time. The high voltage is five volts (5 V) and the low voltage is zero volts (0 V). The transition from five volts to zero volts occurs at the time designated one hundred ninety microseconds (190.0 μs). This is substantially the same as the prior art response shown in FIG. 10A.

FIG. 11B shows the corresponding variation of the output current IOUT. The high current is about forty milliamperes (40 mA) and the low current is about zero milliamperes (0 mA). FIG. 11B shows that the fall time of the IOUT signal is sixteen and four tenths nanoseconds (16.4 ns). This represents a fall time that is about sixteen times faster than the fall time for the prior art device.

FIG. 11C shows the corresponding variation of the VC voltage. The initial value is about three and two tenths volts (3.2 V). The value of the VC voltage fluctuates very slightly around this value but quickly returns to the 3.2 volt value.

Figure 12:
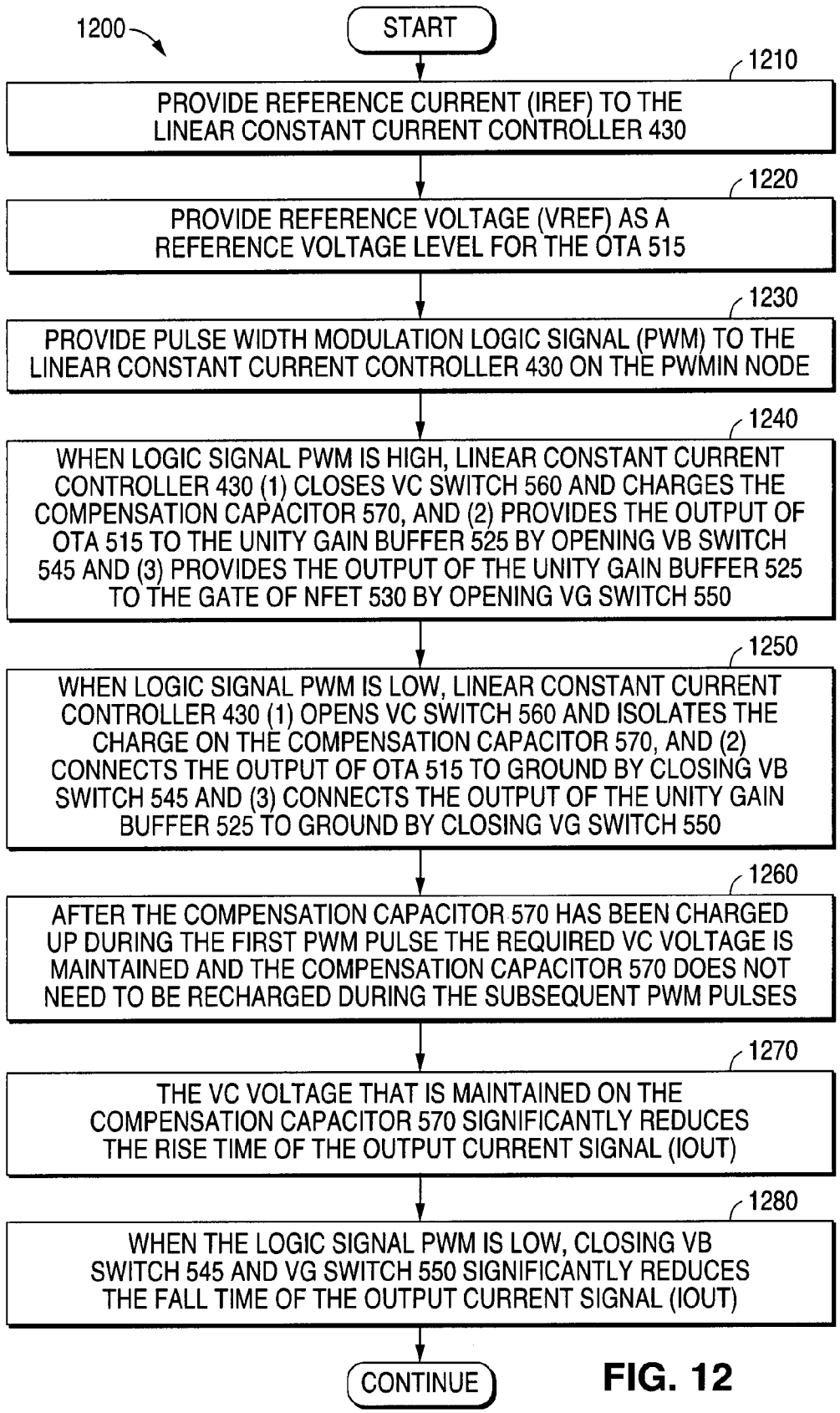
FIG. 12 illustrates a flow chart showing the steps of an advantageous embodiment of a method of the present invention.

FIG. 12 illustrates a flow chart 1200 showing the steps of an advantageous embodiment of the method of the present invention. In the first step of the method a reference current (IREF) is provided to the linear constant current controller 430 of the present invention (step 1210). Then a reference voltage (VREF) is provided as a reference voltage level for the operational transconductance amplifier (OTA) 515 (step 1220). Then a pulse width modulation logic signal (PWM) is provided to the linear constant current controller 430 on the PWMIN node (step 1230).

When the logic signal PWM is high, then the linear constant current controller 430 (1) closes the VC switch 560 and charges the compensation capacitor 570, and (2) provides the output of the operational transconductance amplifier (OTA) 515 to the unity gain buffer 525 by opening the VB switch 545, and (3) provides the output of the unity gain buffer 525 to the gate of the NFET 530 by opening the VG switch 550 (step 1240).

When the logic signal PWM is low, then the linear constant current controller 430 (1) opens the VC switch 560 and isolates the charge on the compensation capacitor 570, and (2) connects the output of the operational transconductance amplifier (OTA) 515 to ground by closing the VB switch 545, and (3) connects the output of the unity gain buffer 525 to ground by closing VG switch 550 (step 1250).

After the compensation capacitor 570 has been charged up during the first PWM pulse the required VC voltage is maintained on the compensation capacitor 570 and the compensation capacitor 570 does not need to be recharged during the subsequent PWM pulses (step 1260). The VC voltage that is maintained on the compensation capacitor 570 significantly reduces the rise time of the output current signal (IOUT) (step 1270). When the logic signal PWM is low, closing the VB switch 545 and closing the VG switch 550 significantly reduces the fall time of the output current signal (IOUT) (step 1280).

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A linear constant current controller comprising:
   an operational amplifier;
   a compensation capacitor connected to an output of said operational amplifier;
   a first switch circuit connected between said compensation capacitor and said output of said operational amplifier;
   a buffer connected to said output of said operational amplifier;
   a second switch circuit configured to switchably couple an input of said buffer to ground; and
   a third switch circuit configured to switchably couple an output of said buffer to ground;
   wherein said second and third switch circuits are configured to open when said first switch circuit connects said compensation capacitor to said output of said operational amplifier, and wherein said second and third switch circuits are configured to close when said first switch circuit disconnects said compensation capacitor from said output of said operational amplifier.

2. The linear constant current controller as claimed in claim 1, wherein the first switch circuit is configured to operate in response to a switch signal to alternately connect and disconnect said compensation capacitor from said output of said operational amplifier.

3. The linear constant current controller as claimed in claim 2, wherein a first portion of said switch signal closes said first switch circuit, and a second portion of said switch signal opens said first switch circuit.

4. The linear constant current controller as claimed in claim 2, wherein a first portion of said switch signal closes said second and third switch circuits, and a second portion of said switch signal opens said second and third switch circuits.

5. The linear constant current controller as claimed in claim 2, further comprising an inverter configured to invert said switch signal.

6. The linear constant current controller as claimed in claim 1, wherein closure of said second switch circuit and closure of said third switch circuit enables said linear constant current controller to generate an output current that has a fall time of less than twenty nanoseconds.

7. The linear constant current controller as claimed in claim 1, wherein said first switch circuit is configured to open to isolate said compensation capacitor from said output of said operational amplifier when said output of said operational amplifier is connected to ground.

8. The linear constant current controller as claimed in claim 1, wherein the output of the buffer is connected to a gate of an n-channel field effect transistor (NFET).

9. A linear constant current controller comprising:
an operational amplifier;
a compensation capacitor connected to an output of said operational amplifier;
a first switch circuit connected between said compensation capacitor and said output of said operational amplifier;
a buffer connected to said output of said operational amplifier;
a second switch circuit configured to switchably couple an input of said buffer to ground; and
a third switch circuit configured to switchably couple an output of said buffer to ground;
wherein isolation of said compensation capacitor enables said linear constant current controller to generate an output current that has a rise time of less than fifty nanoseconds.

10. An apparatus that is configured to provide a pulsating current output having ultra fast rise and fall times, said apparatus comprising a linear constant current controller comprising:
an operational amplifier;
a compensation capacitor connected to an output of said operational amplifier;
a first switch circuit connected between said compensation capacitor and said output of said operational amplifier;
a unity gain buffer connected to said output of said operational amplifier;
a second switch circuit configured to switchably couple an input of said unity gain buffer to ground; and
a third switch circuit configured to switchably couple an output of said unity gain buffer to ground;
wherein said second and third switch circuits are configured to open when said first switch circuit connects said compensation capacitor to said output of said operational amplifier, and wherein said second and third switch circuits are configured to close when said first switch circuit disconnects said compensation capacitor from said output of said operational amplifier.

11. The apparatus as claimed in claim 10, wherein said first switch circuit is configured to open to isolate said compensation capacitor from said output of said operational amplifier when said output of said operational amplifier is connected to ground.

12. The apparatus as claimed in claim 11, wherein said isolation of said compensation capacitor enables said linear constant current controller to generate the pulsating current output that has a rise time of less than fifty nanoseconds.

13. The apparatus as claimed in claim 10, wherein the output of the unity gain buffer is connected to a gate of an n-channel field effect transistor (NFET).

14. The apparatus as claimed in claim 10, wherein closure of said second switch circuit and closure of said third switch circuit enables said linear constant current controller to generate the pulsating current output that has a fall time of less than twenty nanoseconds.

15. The apparatus as claimed in claim 10, wherein said first, second, and third switch circuits are configured to operate in response to a switch signal.

16. The apparatus as claimed in claim 15, wherein said linear constant current controller further comprises an inverter configured to invert said switch signal and to provide said inverted switch signal to said second and third switch circuits.

17. A method for providing a pulsating current output having ultra fast rise and fall times, the method comprising the steps of:
selectively connecting and disconnecting a compensation capacitor to and from an output of an operational amplifier in a linear constant current controller using a first switch circuit, said first switch circuit connected between said compensation capacitor and said output of said operational amplifier;
selectively connecting and disconnecting an input of a buffer to and from ground using a second switch circuit, said input of said buffer coupled to said output of said operational amplifier; and
selectively connecting and disconnecting an output of said buffer to and from ground using a third switch circuit;
wherein the selective connecting and disconnecting steps comprise:
closing said first switch circuit to charge said compensation capacitor from said output of said operational amplifier;
opening said second and third switch circuits when said first switch circuit closes to connect said compensation capacitor to said output of said operational amplifier;
opening said first switch circuit to isolate said compensation capacitor from said output of said operational amplifier when said output of said operational amplifier is connected to ground; and
closing said second and third switch circuits when said first switch circuit opens to disconnect said compensation capacitor from said output of said operational amplifier.

18. The method as claimed in claim 17, further comprising the step of:
maintaining a voltage on said compensation capacitor such that a rise time of said pulsating current output is less than fifty nanoseconds.

19. The method as claimed in claim 17, wherein the output of the buffer is connected to a gate of an n-channel field effect transistor (NFET).

20. The method as claimed in claim 17, further comprising the step of:
connecting said output of said operational amplifier to ground such that a fall time of said pulsating current output is less than twenty nanoseconds.

* * * * *